(12) United States Patent
Li et al.

(10) Patent No.: US 10,798,142 B2
(45) Date of Patent: Oct. 6, 2020

(54) METHOD, APPARATUS AND SYSTEM OF VIDEO AND AUDIO SHARING AMONG COMMUNICATION DEVICES

(71) Applicants: Qiang Li, Beijing (CN); Yangzhou Du, Beijing (CN); Wenlong Li, Beijing (CN); Xiaofeng Tong, Beijing (CN); Wei Hu, Beijing (CN); Lin Xu, Beijing (CN); Yimin Zhang, Beijing (CN)

(72) Inventors: Qiang Li, Beijing (CN); Yangzhou Du, Beijing (CN); Wenlong Li, Beijing (CN); Xiaofeng Tong, Beijing (CN); Wei Hu, Beijing (CN); Lin Xu, Beijing (CN); Yimin Zhang, Beijing (CN)

(73) Assignee: Intel Corporation, Santa Clara, CA (US)

( * ) Notice: Subject to any disclaimer, the term of this patent is extended or adjusted under 35 U.S.C. 154(b) by 387 days.

(21) Appl. No.: 14/128,996

(22) PCT Filed: Dec. 10, 2012

(86) PCT No.: PCT/CN2012/086260
§ 371 (c)(1),
(2) Date: Dec. 23, 2013

(87) PCT Pub. No.: WO2014/089732
PCT Pub. Date: Jun. 19, 2014

(65) Prior Publication Data
US 2015/0281309 A1 Oct. 1, 2015

(51) Int. Cl.
| | | |
|---|---|---|
| *G06F 15/16* | (2006.01) | |
| *H04L 29/06* | (2006.01) | |
| *H04N 21/235* | (2011.01) | |
| *H04N 21/242* | (2011.01) | |
| *H04N 21/434* | (2011.01) | |

(Continued)

(52) U.S. Cl.
CPC ............ *H04L 65/607* (2013.01); *G10L 19/04* (2013.01); *H04N 21/235* (2013.01);
(Continued)

(58) Field of Classification Search
CPC .. H04L 65/607; H04N 65/607; H04N 21/235; H04N 21/242; H04N 21/4341;
(Continued)

(56) References Cited

U.S. PATENT DOCUMENTS 6,643,330 B1 * 11/2003 Nakagawa ............... H04N 7/52
375/240.28
7,636,662 B2 12/2009 Dimtrova
(Continued)

FOREIGN PATENT DOCUMENTS

| CN | 1860504 | 11/2006 |
|---|---|---|
| CN | 1860504 A | 11/2006 |

(Continued)

OTHER PUBLICATIONS

International Search Report and Written Opinion received for PCT Patent Application No. PCT/CN2012/086260, dated Sep. 19, 2013, 11 pages.
(Continued)

*Primary Examiner* — Nicholas P Celani
*Assistant Examiner* — Karina J Garcia-Ching
(74) *Attorney, Agent, or Firm* — Barnes & Thornburg LLP

(57) ABSTRACT

A device, method and system of video and audio sharing among communication devices, may comprise a communication device for generating and sending a packet containing information related to the video and audio, and another communication device for receiving the packet and rendering the information related to the audio and video. In some embodiments, the communication device may comprise: an
(Continued)

audio encoding module to encode a piece of audio into an audio bit stream; an avatar data extraction module to extract avatar data from a piece of video and generate an avatar data bit stream; and a synchronization module to generate synchronization information for synchronizing the audio bit stream with the avatar parameter stream.

19 Claims, 5 Drawing Sheets

(51) Int. Cl.
  *H04N 21/43* (2011.01)
  *H04N 21/435* (2011.01)
  *H04N 21/2368* (2011.01)
  *G10L 19/04* (2013.01)

(52) U.S. Cl.
  CPC ....... *H04N 21/2368* (2013.01); *H04N 21/242* (2013.01); *H04N 21/435* (2013.01); *H04N 21/4307* (2013.01); *H04N 21/4341* (2013.01)

(58) Field of Classification Search
  CPC ............ H04N 21/4307; H04N 21/435; H04N 21/2368; G10L 19/04
  USPC ......................................................... 709/217
  See application file for complete search history.

(56) References Cited

U.S. PATENT DOCUMENTS

| | | | |
|---|---|---|---|
| 2004/0015610 A1* | 1/2004 | Treadwell | H04L 12/581 709/246 |
| 2006/0050890 A1* | 3/2006 | Tsuhako | H04R 5/02 381/27 |
| 2006/0092772 A1* | 5/2006 | Tsai | G11B 20/10 369/30.01 |
| 2006/0290699 A1 | 12/2006 | Dimtrva et al. | |
| 2007/0188502 A1* | 8/2007 | Bishop | G06T 13/40 345/473 |
| 2010/0141611 A1* | 6/2010 | Lee | G06F 3/033 345/184 |

FOREIGN PATENT DOCUMENTS

| | | |
|---|---|---|
| CN | 102663928 | 9/2012 |
| CN | 102663928 A | 9/2012 |
| WO | 2007110679 | 4/2007 |
| WO | 2007110679 A2 | 10/2007 |
| WO | 2007110679 A3 | 4/2009 |

OTHER PUBLICATIONS

Office Action for Chinese Patent Application No. 201280076949.9, dated May 3, 2017, including English translation (19 pages).

Decision on Rejection for Chinese Patent Application No. 201280076949.9, dated Jan. 11, 2019, including English translation (19 pages).

Notice of Reexamination for Chinese Patent Application No. 201280076949.9, dated Aug. 7, 2019, including English translation (13 pages).

Office Action for Chinese Patent Application No. 201280076949.9, dated Dec. 27, 2019, including English translation (17 pages).

* cited by examiner

METHOD, APPARATUS AND SYSTEM OF VIDEO AND AUDIO SHARING AMONG COMMUNICATION DEVICES

CROSS REFERENCE TO RELATED APPLICATIONS

This application is a national stage entry under 35 USC § 371(b) of International Application No. PCT/CN2012/086260, which was filed Dec. 10, 2012.

TECHNICAL FIELD

An embodiment of the present patent application relates to video and audio sharing, more specifically, to video and audio sharing using Avatar.

BACKGROUND

Wireless communication technologies provide people with more and more content-enriched information sharing on wireless networks. For example, people can communicate and share video and audio on-line (e.g., video conference), or off-line (e.g., instant message). However, high bandwidth consumption may significantly hinder a widespread use of the off-line video and audio sharing.

BRIEF DESCRIPTION OF THE DRAWINGS

The embodiment described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements.

DETAILED DESCRIPTION

Figure 1:
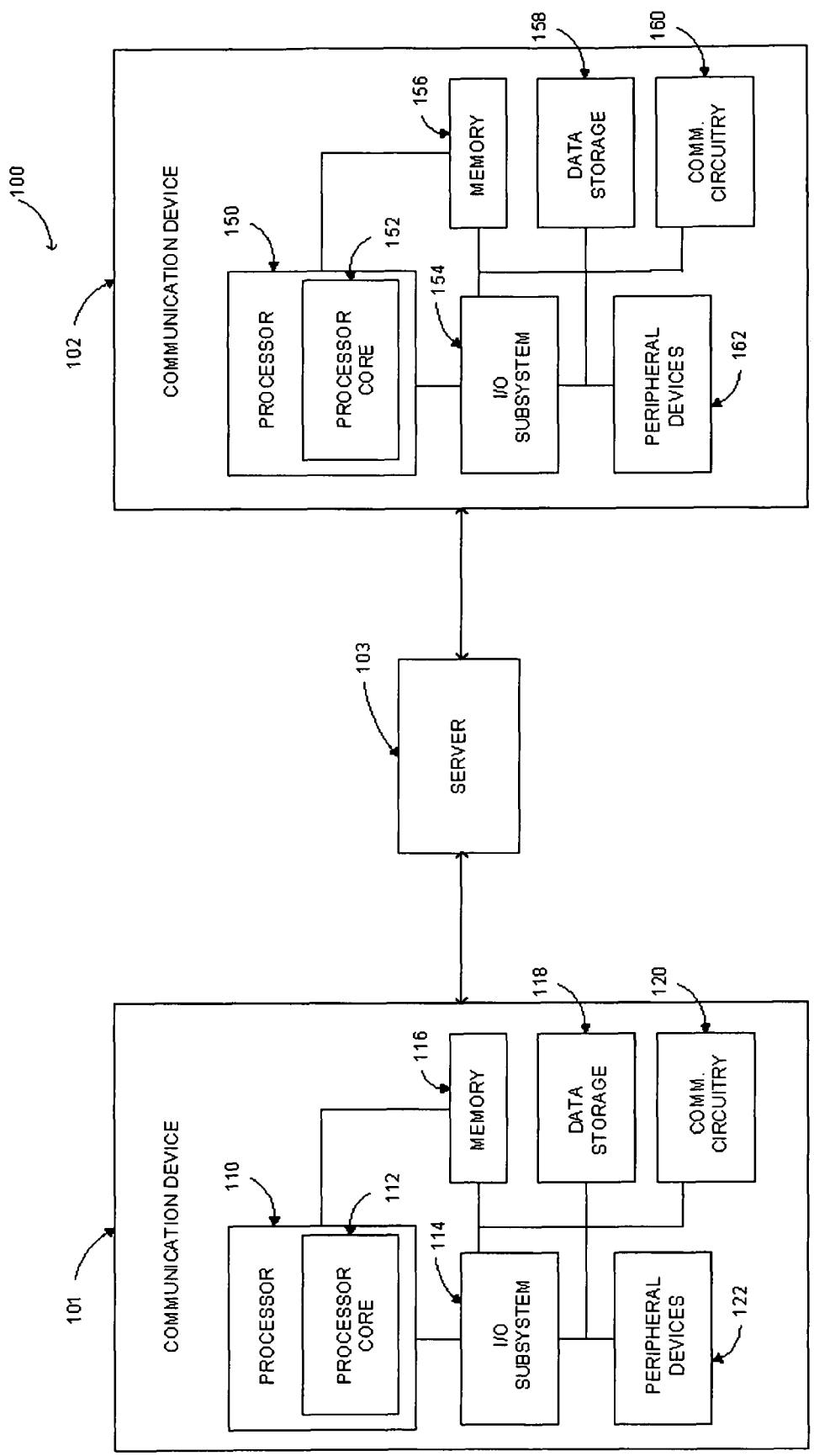
FIG. 1 illustrates an embodiment of a system of sharing video and audio among two communication devices.

While the concepts of the embodiment are susceptible to various modifications and alternative forms, specific exemplary embodiments thereof have been shown by way of example in the drawings and will herein be described in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

In the following description, numerous specific details such as logic implementations, opcodes, means to specify operands, resource partitioning/sharing/duplication implementations, types and interrelationships of system components, and logic partitioning/integration choices are set forth in order to provide a more thorough understanding of the present disclosure. It will be appreciated, however, by one skilled in the art that embodiments of the disclosure may be practiced without such specific details. In other instances, control structures, gate level circuits and full software instruction sequences have not been shown in detail in order not to obscure the embodiment. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Embodiments may be implemented in hardware, firmware, software, or any combination thereof. Embodiments implemented in a computer system may include one or more bus-based interconnects between components and/or one or more point-to-point interconnects between components. Embodiments may also be implemented as instructions carried by or stored on a transitory or non-transitory machine-readable (e.g., computer-readable) medium, which may be read and executed by one or more processors. A machine-readable medium may be embodied as any device, mechanism, or physical structure for storing or transmitting information in a form readable by a machine (e.g., a computing device). For example, a machine-readable medium may be embodied as read only memory (ROM); random access memory (RAM); magnetic disk storage media; optical storage media; flash memory devices; mini- or micro-SD cards, memory sticks, electrical signals, and others.

In the drawings, specific arrangements or orderings of schematic elements, such as those representing devices, modules, instruction blocks, and data elements, may be shown for ease of description. However, it should be understood by those skilled in the art that the specific ordering or arrangement of the schematic elements in the drawings is not meant to imply that a particular order or sequence of processing, or separation of processes, is required. Further, the inclusion of a schematic element in a drawing is not meant to imply that such element is required in all embodiments or that the features represented by such element may not be included in or combined with other elements in some embodiments.

In general, schematic elements used to represent instruction blocks may be implemented using any suitable form of machine-readable instruction, such as software or firmware applications, programs, functions, modules, routines, processes, procedures, plug-ins, applets, widgets, code fragments and/or others, and that each such instruction may be implemented using any suitable programming language, library, application programming interface (API), and/or other software development tools. For example, some embodiments may be implemented using Java, C++, and/or other programming languages. Similarly, schematic elements used to represent data or information may be implemented using any suitable electronic arrangement or structure, such as a register, data store, table, record, array, index, hash, map, tree, list, graph, file (of any file type), folder, directory, database, and/or others.

Further, in the drawings, where connecting elements, such as solid or dashed lines or arrows, are used to illustrate a connection, relationship or association between or among two or more other schematic elements, the absence of any such connecting elements is not meant to imply that no connection, relationship or association can exist. In other words, some connections, relationships or associations between elements may not be shown in the drawings so as not to obscure the disclosure. In addition, for ease of illustration, a single connecting element may be used to represent multiple connections, relationships or associations between elements. For example, where a connecting element represents a communication of signals, data or instructions, it should be understood by those skilled in the art that such element may represent one or multiple signal paths (e.g., a bus), as may be needed, to effect the communication.

FIG. 1 illustrates an embodiment of a system 100 of sharing video and audio between two communication devices 101 and 102 via a server 103. In an embodiment, the communication device 101 may be connected with the server 103 through a network, such as a wireless network or an internet. Similarly, the communication device 102 may also be connected with the server 103 through the network. The communication device 101 may be embodied as, without limitation, a smart phone, a cellular telephone, a tablet, a consumer electronic device, a laptop computer, a notebook computer, a desktop computer, a mobile computing system, a work station, a network appliance, a web appliance, a processor-based system, and/or any other communication device configured to generate a packet containing information related to the video and audio to be shared offline with the communication device 102. The packet may be embodied, without limitation, an instant message, a short message, or other data stream.

In an embodiment, the communication device 101 may include a processor 110, an I/O subsystem 114, a memory 116, a data storage 118, a communication circuitry 120, and one or more peripheral devices 122. In some embodiments, several of the foregoing components may be incorporated on a motherboard or main board of the communication device 101, while other components may be communicatively coupled to the motherboard via, for example, a peripheral port. Furthermore, it should be appreciated that the communication device 101 may include other components, sub-components, and devices commonly found in a communication and/or computing device, which are not illustrated in FIG. 1 for clarity of the description.

The processor 110 of the communication device 101 may be embodied as any type of processor capable of executing software/firmware, such as a microprocessor, digital signal processor, microcontroller, or the like. The processor 110 is illustratively embodied as a single core processor having a processor core 112. However, in other embodiments, the processor 110 may be embodied as a multi-core processor having multiple processor cores 112. Additionally, the communication device 101 may include additional processors 110 having one or more processor cores 112.

The I/O subsystem 114 of the communication device 101 may be embodied as circuitry and/or components to facilitate input/output operations with the processor 110 and/or other components of the communication device 102. In some embodiments, the I/O subsystem 114 may be embodied as a memory controller hub (MCH or "northbridge"), an input/output controller hub (ICH or "southbridge") or platform controller hub (PCH), and a firmware device. In such embodiments, the firmware device of the I/O subsystem 114 may be embodied as a memory device for storing Basic Input/Output System (BIOS) data and/or instructions and/or other information (e.g., a BIOS driver used during booting of the communication device 101). However, in other embodiments, I/O subsystems having other configurations may be used. For example, in some embodiments, the I/O subsystem 114 may be embodied as a platform controller hub (PCH). In such embodiments, the memory controller hub (MCH) may be incorporated in or otherwise associated with the processor 110, and the processor 110 may communicate directly with the memory 116 (as shown by the dashed line in FIG. 1). Additionally, in other embodiments, the I/O subsystem 114 may form a portion of a system-on-a-chip (SoC) and be incorporated, along with the processor 110 and other components of the communication device 101, on a single integrated circuit chip.

The processor 110 is communicatively coupled to the I/O subsystem 114 via a number of signal paths. These signal paths (and other signal paths illustrated in FIG. 1) may be embodied as any type of signal paths capable of facilitating communication between the components of the communication device 101. For example, the signal paths may be embodied as any number of point-to-point links, wires, cables, light guides, printed circuit board traces, vias, bus, intervening devices, and/or the like.

The memory 116 of the communication device 101 may be embodied as or otherwise include one or more memory devices or data storage locations including, for example, dynamic random access memory devices (DRAM), synchronous dynamic random access memory devices (SDRAM), double-data rate synchronous dynamic random access memory device (DDR SDRAM), mask read-only memory (ROM) devices, erasable programmable ROM (EPROM), electrically erasable programmable ROM (EEPROM) devices, flash memory devices, and/or other volatile and/or non-volatile memory devices. The memory 116 is communicatively coupled to the I/O subsystem 114 via a number of signal paths. Although only a single memory device 116 is illustrated in FIG. 1, the communication device 101 may include additional memory devices in other embodiments. Various data and software may be stored in the memory 116. For example, one or more operating systems, applications, programs, libraries, and drivers that make up the software stack executed by the processor 110 may reside in memory 116 during execution.

The data storage 118 may be embodied as any type of device or devices configured for the short-term or long-term storage of data. For example, the data storage 118 may include any one or more memory devices and circuits, memory cards, hard disk drives, solid-state drives, or other data storage devices The communication circuitry 120 of the communication device 101 may include any number of devices and circuitry for enabling communications between the communication device 101 and one or more devices or networks as discussed in more detail below. The communication circuitry 120 may be configured to use any one or more, or combination thereof, communication protocols to communicate, such as, for example, a cellular communication protocol (e.g., Wideband Code Division Multiple Access (W-CDMA)), a wireless network communication protocol (e.g., Wi-Fi®, WiMAX), a wireless personal area network communication protocol (e.g., Bluetooth®), a wired network communication protocol (e.g., TCP/IP), and/or other communication protocols.

In some embodiments, the communication device 101 may also include one or more peripheral devices 122. Such peripheral devices 122 may include any number of additional input/output devices, interface devices, and/or other peripheral devices. For example, in some embodiments, the peripheral devices 122 may include a display, touch screen, graphics circuitry, keyboard, speaker system, and/or other input/output devices, interface devices, and/or peripheral devices.

The communication device 102, for receiving the packet and rendering the video and audio, may be substantially similar to the communication device 101 and include similar components, which have been identified in FIG. 1 with a common reference numbering scheme, e.g., a processor 150, a processor core 152, an I/O subsystem 154, a memory 156, a data storage 158, a communication circuitry 160 and one or more peripheral devices 162. As such, the description provided above of the components of the communication device 101 is equally applicable to those similar components of the communication device 102 and is not repeated herein so as not to obscure the present disclosure. Of course, it should be appreciated that in some embodiments the communication devices 101, 102 of the system 100 may be dissimilar to each other. For example, the communication devices 101 and 102 may be embodied as various types of communication devices different from each other (e.g., a smart phone, a tablet, a laptop computer, a notebook computer, or other communication device) and include components typically found in such corresponding communication devices.

In order to lower bandwidth consumption while keeping reality of facial expression and/or motion of an object presenting in the video, the communication device 101 may extract Avatar data indicating the object's facial expression and/or motion from the video, and synchronization information may be inserted into Avatar data bit streams and/or audio bit streams before packing the packet. The communication device 101 may transmit the packet to the server 103 regardless if the communication device 102 is connected to the server or not.

The communication device 102 may receive the packet from the server 103 regardless if the communication device 101 is connected to the server or not. With the help of the synchronization information, the communication device 102 may render the audio and an Avatar model animated based on the Avatar data to represent the scene where the video and audio are made at the communication device 101.

Compared with transmitting the video through the instant message, the above-stated scheme may be useful to save the bandwidth resource with much less quality sacrifice, at least partly because of the offline Avatar data extraction, the Avatar animation, and the synchronization of the Avatar data bit streams and the audio bit streams. Further, the Avatar animation may help to keep secrecy if a message sender doesn't want to reveal his/her real image.

Figure 2:
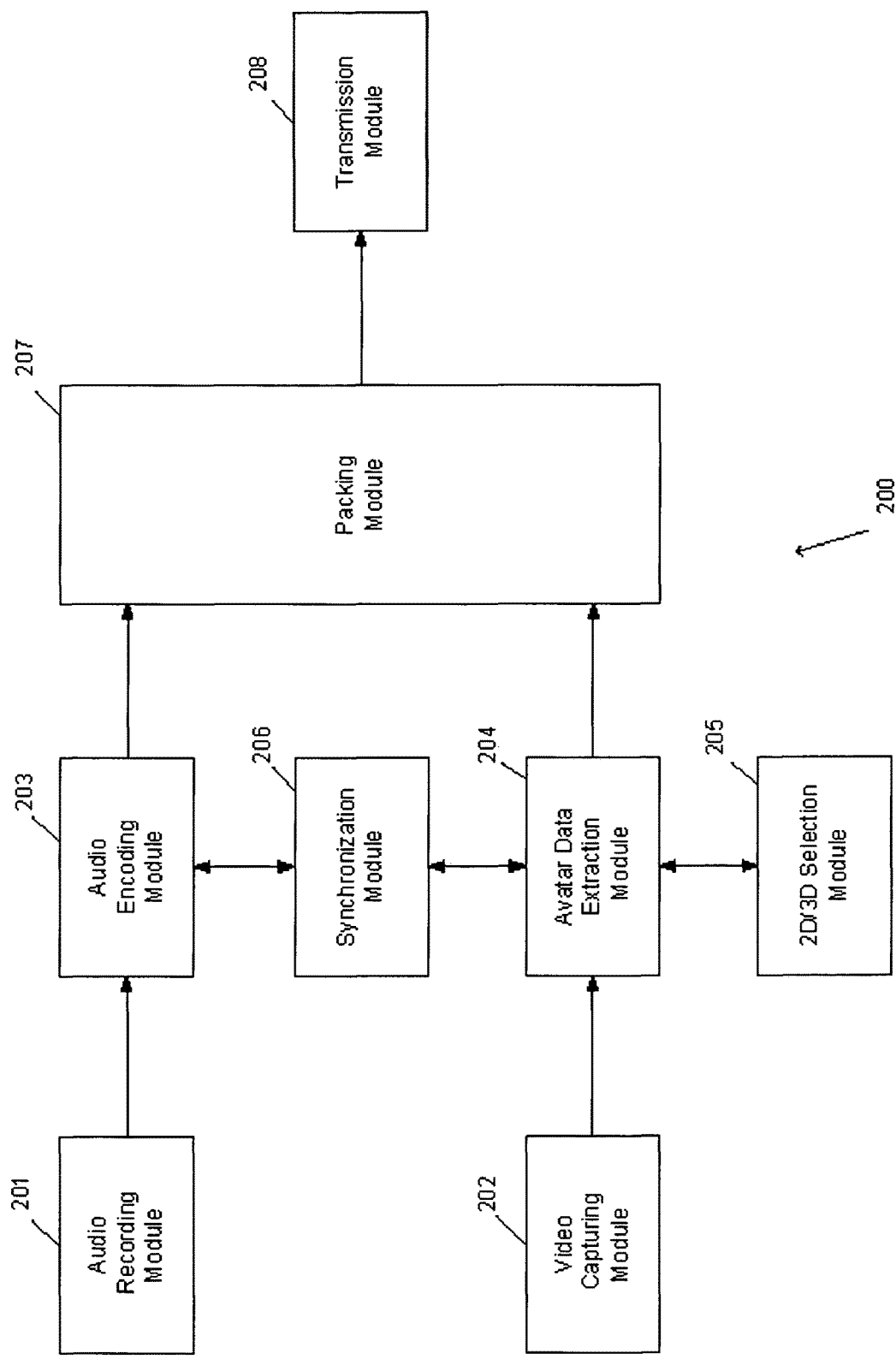
FIG. 2 illustrates an embodiment of an environment of one communication device for generating a packet containing the video and audio information to be shared with another communication device.

FIG. 2 illustrates an embodiment of an environment 200 of the communication device 101 for generating the packet to be shared with the communication device 102. The illustrative environment 200 may include an audio recording module 201, a video capturing module 202, an audio encoding module 203, an Avatar data extraction module 204, a 2D/3D selection module 205, a synchronization module 206, a packing module 207, a transmission module 208, and others.

In an embodiment, a user of the communication device 101 may instruct to send a message to the communication device 102, e.g., an instant message or a short message. The message may include a piece of audio recorded by the audio recording module 201 and a piece of video captured by the video capturing module 202, for example, the audio and video recorded and captured when the user speaks.

The audio encoding module 203 may encode the recorded audio into a plurality of audio bit streams under various audio encoding schemes, such as MPEG, AAC, AC3, etc. The Avatar data extraction module 204 may extract Avatar data from the piece of video, based on Avatar technologies. The Avatar data may include Avatar parameters indicating facial expression and/or motions of the object presenting in the video, such as the user's head.

The 2D/3D selection module 205 may select 2D or 3D dimensions for Avatar animation. The 2D/3D selection result may affect the Avatar parameters extracted by the Avatar data extraction module 204. For example, under 2D selection, the Avatar parameters may be embodied, without limitation, parameters related to x-axis translation, y-axis translation, in-plane rotation, and/or others. However, under 3D selection, the Avatar parameters may be embodied, without limitation, parameters related to out-of-plane rotation, z-axis translation, and/or others. It should be understood that 2D and 3D may have parameters in common, such as parameters related to motions of the object's mouth, nose, eyes, etc.

The Avatar data extraction module 204 may further convert the Avatar data into one or more Avatar data bit streams using a data compression scheme, which may exploit its temporal and spatial redundancies.

Compared with online video and audio communication and sharing, the offline messaging may allow the Avatar data extraction module 204 more time to extract the Avatar data from the captured video, which can help to improve the quality of Avatar animation at the communication device 102.

The synchronization module 206 may generate synchronization information for synchronizing the audio bit streams with the Avatar data bit streams. The synchronization information may be embodied, without limitation, time markers (e.g., time stamps), synchronization symbols, and/or others. The synchronization module 206 may generate the synchronization information based on an audio sampling rate that the audio encoding module 203 samples the piece of audio before the encoding, and an Avatar sampling rate that the Avatar data extraction module 204 samples the piece of video before the extraction. The synchronization module 206 may further insert the synchronization information into the audio bit streams and the Avatar data bit streams.

It should be understood that the time markers inserted into the audio bit streams may differ from the time markers inserted into the Avatar bit streams. In this case, the synchronization information may further include correlation information correlating the time markers in the audio bit streams and the time markers in the audio bit streams.

The packing module 207 may pack the audio bit streams, the Avatar data bit streams and the synchronization information into one or more packets (e.g., the instant messages). During the packing, the audio bit streams, the Avatar data bit streams and the synchronization information may be compressed in order to further reduce the data size. In an embodiment, the packet may further include an identifier of the object presented in the video, in order to help the communication device 102 to retrieve an Avatar model corresponding to the object. In another embodiment, the communication device 101 may pack another packet containing the Avatar model and send the packet to the communication device 102, separately from the packet containing the audio and Avatar data bit streams. In an embodiment, the Avatar model may be a real model of the object, e.g., the user's head. In another embodiment, the Avatar model may be a virtual model of the object, such as a movie star's head or a cat's head.

The transmission module 208 may transmit the packet to the server 103, regardless whether the communication device 102 is connected or not.

Figure 3:
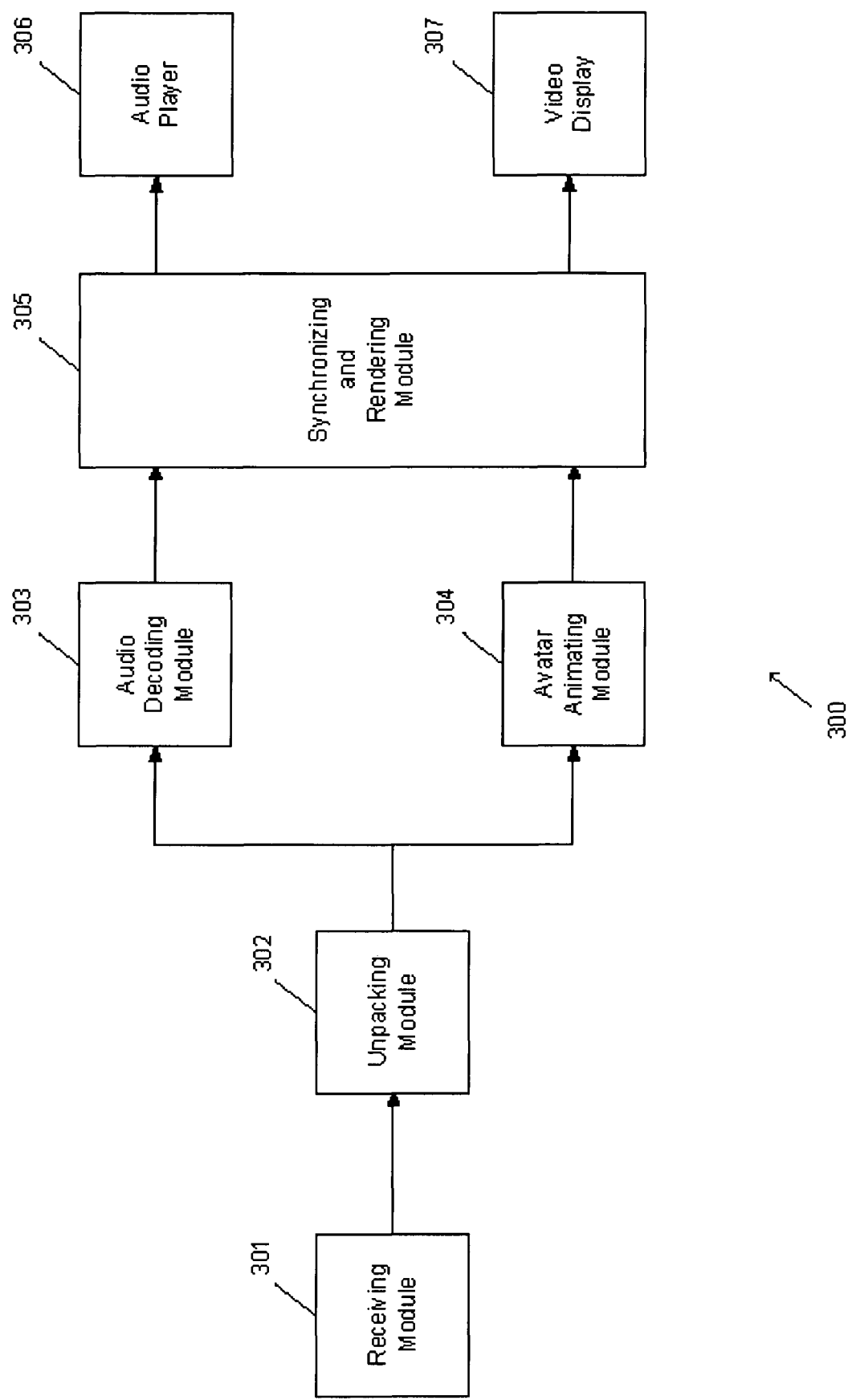
FIG. 3 illustrates an embodiment of an environment of another communication device for receiving the packet and rendering the video and audio information.

FIG. 3 illustrates an embodiment of an environment 300 of the communication device 102 for receiving the packet and rendering the audio and the Avatar animation. The illustrative environment 300 may include a receiving module 301, an unpacking module 302, an audio decoding module 303, an Avatar animating module 304, a synchronizing and rendering module 305, an audio player 306, a video display 307, and/other others.

In an embodiment, the receiving module 301 may receive the packet containing the audio bit streams, the Avatar data bit streams, the synchronization information, the identifier of the object appearing in the video captured at the communication device 101, and/or others. The unpacking module 302 may unpack the packet into the audio bit streams, the Avatar data bit streams, the synchronization information, the object identifier, and/or others. During the unpacking, the packet may be uncompressed in order to obtain the above-stated data or information.

The audio decoding module 303 may decode the audio bit streams into decoded audio data, under various audio decoding schemes, such as MPEG, AAC, AC3 and others. The Avatar animating module 304 may animate the Avatar model based on the Avatar data bit streams to generate an animated Avatar model. More particularly, the Avatar animating module 304 may retrieve the Avatar model corresponding to the object identifier included in the packet. In an embodiment, the Avatar model may be the real model of the object, such as the user's head. In another embodiment, the Avatar model may be the virtual model of the object, such as the cat's head. The Avatar animating module 304 may animate the Avatar model based on the Avatar data bit streams through mapping the Avatar data on the Avatar model. If the Avatar data bit streams include Avatar parameters indicating the facial expression and/or motions of the object, the Avatar animation module may map the facial expression and/or motions on the Avatar model. For example, the Avatar animation module may transform motion animation parameters of sparse key-points of a source object model (e.g., a user's face) onto the target Avatar model and make the target Avatar model do the same animation, such as smile, surprise, yawn, etc.

Considering the Avatar model and the Avatar parameters may differ based on the 2D or 3D selection, the Avatar animation module 304 may retrieve and animate the Avatar model further based on the 2D/3D selection result, which may be sent from the communication device 101 via the packet.

The synchronizing and rendering module 305 may render the decoded audio data and the animated Avatar model, while synchronizing them with the synchronization information. For example, if the synchronization information is the timestamps inserted in the audio bit streams and the Avatar data bit streams, the synchronizing and rendering module 305 may render a part of the digital audio data decoded from the audio bit streams between the two timestamps, while rendering the Avatar model animated from the Avatar data bit streams between the same two timestamps.

It should be understood that the time stamps inserted into the audio bit streams may differ from the time stamps inserted into the Avatar bit streams. In this case, the synchronization information may further include the correlation information correlating the time stamps in the audio bit streams and the time stamps in the audio bit streams, which may be used by the synchronizing and rendering module 305 for the synchronization.

The audio player 306 and the video display 307 may play the rendered audio and Avatar video, so that a user of the communication device 102 may receive the message from the user of the communication device 101.

Figure 4:
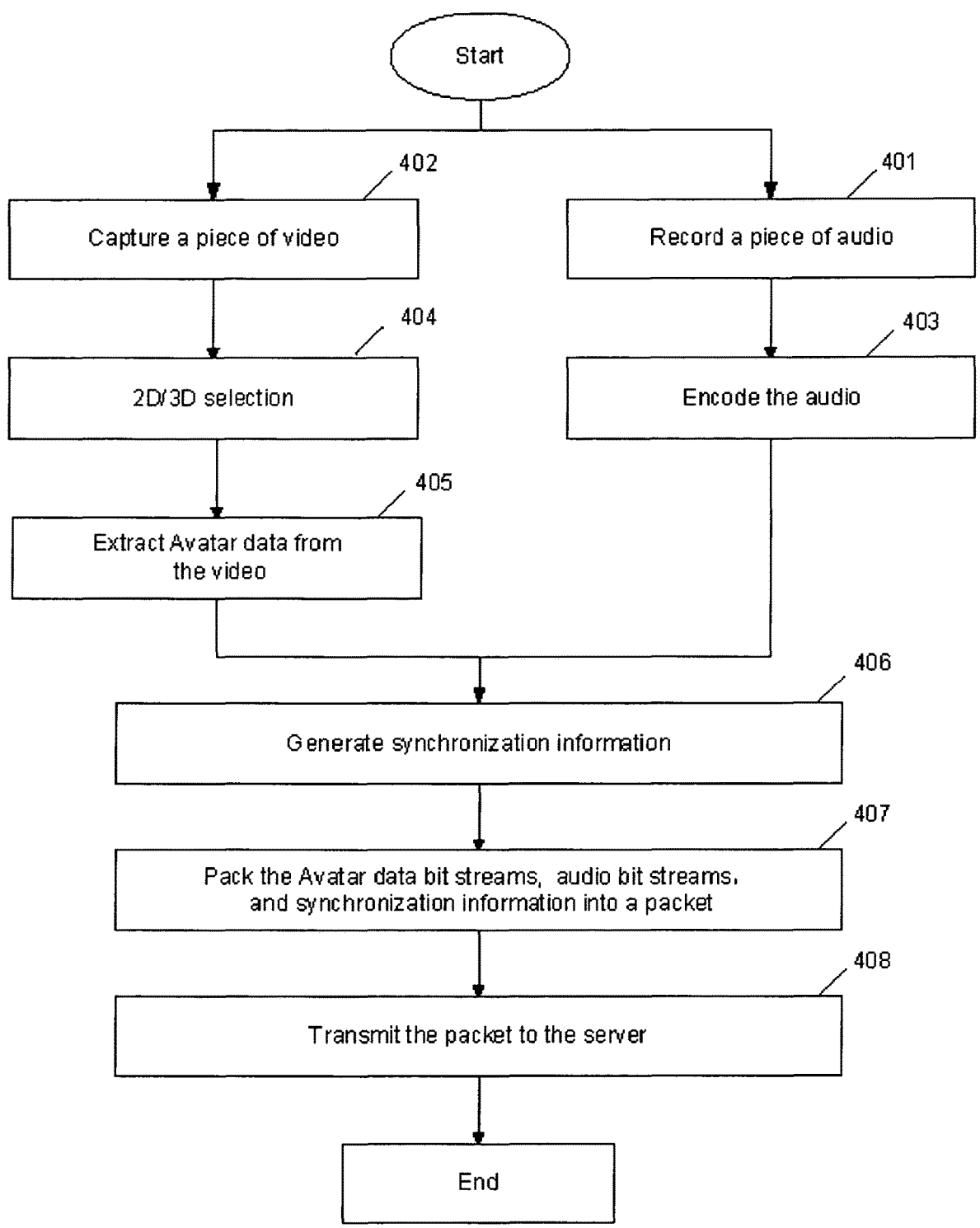
FIG. 4 illustrates an embodiment of a method of the one communication device for generating the packet containing the video and audio information to be shared with another communication device.

FIG. 4 illustrates an embodiment of a method of the communication device 101 for generating the packet containing the video and audio information to be shared with the communication device 102. In block 401, the audio recording module 201 may record the piece of audio, and in block 402, the video capturing module 202 may capture the piece of video. For example, a recorder and a camera of the communication device 101 may record the audio and capture the video when the user of the communication device 101 speaks.

In block 403, the audio encoding module 203 may encode the piece of audio into the one or more audio bit streams under various audio encoding schemes, such as MPEG, AAC, AC3, or others. In block 404, the 2D/3D selection module 205 may select 2D or 3D for Avatar animation. Based on the 2D/3D selection result, in block 405, the Avatar data extraction module 204 may extract the Avatar data from the piece of video and convert the Avatar data into the one or more Avatar data bit streams. In an embodiment, the Avatar data may include the Avatar parameters indicating the facial expression and/or motions of the object presenting in the video, such as the user's head.

In block 406, the synchronization module 206 may generate the synchronization information for synchronizing the audio bit streams and the Avatar data bit streams. The synchronization information may be embodied, without limitation, time markers (e.g., time stamps), synchronization symbols, and/or others. In an embodiment, the synchronization module 206 may generate the synchronization information based on the audio sampling rate that the audio encoding module 203 samples the piece of audio before the encoding, and the Avatar sampling rate that the Avatar data extraction module 204 samples the piece of video before the extraction. The synchronization module 206 may further insert the synchronization information into the audio bit streams and the Avatar data bit streams.

It should be understood that the time markers may be inserted into the audio bit streams and may differ from the time markers inserted into the Avatar bit streams. In this case, the synchronization information may further include correlation information correlating the time markers inserted in the audio bit streams and the time markers inserted in the audio bit streams.

In block 407, the packing module 207 may pack the audio bit streams, the Avatar data bit streams, and the synchronization information into the one or more packets, such as the instant messages. In an embodiment, the packet may include other information, such as the object identifier and/or 2D/3D selection result. In block 408, the transmission module 208 may transmit the packet to the server, regardless if the communication device 102 is connected to the server or not. In an embodiment, the packing module 207 may pack the Avatar model corresponding to the object into another packet, and transmit the packet separately to the server. In another embodiment, the Avatar model may be previously installed in the communication device 102. The Avatar model may differ based on the 2D/3D selection, such as 2D Avatar model or 3D Avatar model.

Figure 5:
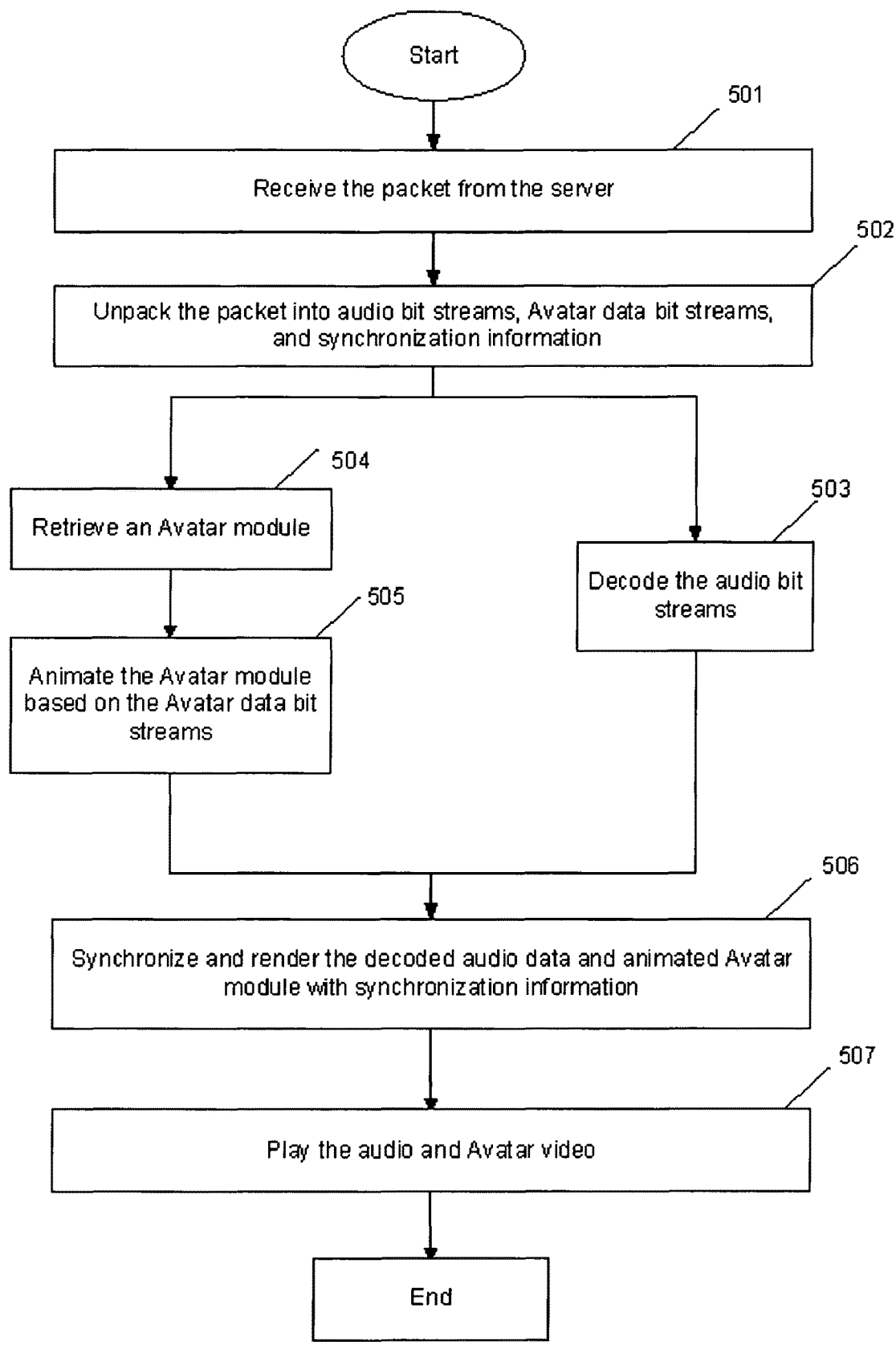
FIG. 5 illustrates an embodiment of a method of another communication device for receiving the packet and rendering the video and audio information.

FIG. 5 illustrates an embodiment of a method of the communication device 102 for receiving the packet and rendering the video and audio information. In block 501, the receiving module 301 may receive the packet from the server, regardless if the communication device 101 is connected to the server or not.

In block 502, the unpacking module 302 may unpack the packet into the audio bit streams, the Avatar data bit streams, and the synchronization information. In an embodiment, the unpacking module 302 may obtain other information from the packet, such as the object identifier and/or the 2D/3D selection result. In block 503, the audio decoding module 303 may decode the audio bit streams into decoded audio data. In block 504, the Avatar animating module 304 may retrieve the Avatar model using the object identifier and/or the 2D/3D selection result.

In block 505, the Avatar animating module 304 may animate the Avatar model based on the Avatar data bit streams to generate the animated Avatar model, by mapping the Avatar data on the Avatar model. For example, if the Avatar data includes the Avatar parameters indicating the facial expression and/or the motions of the object appearing in the video, the facial expression and/or the motions may be represented on the Avatar model. In block 506, the synchronizing and rendering module 305 may synchronize and render the decoded audio data and animated Avatar model by using the synchronization information. For example, if the synchronization information is the timestamps inserted in the audio bit streams and the Avatar data bit streams, the synchronizing and rendering module 305 may render a part of the digital audio data decoded from the audio bit streams between the two timestamps, meanwhile rendering the Avatar model animated from the Avatar data bit streams between the same two timestamps.

In block 507, the audio player 306 may play the audio and the video display 307 may play the Avatar video so that the user of the communication device 102 may receive the message from the user of the communication device 101.

While the disclosure has been illustrated and described in detail in the drawings and foregoing description, such an illustration and description is to be considered as exemplary and not restrictive in character, it being understood that only illustrative embodiments have been shown and described and that all changes and modifications consistent with the disclosure and recited claims are desired to be protected.

EXAMPLES

Illustrative examples of the devices, systems, and methods disclosed herein are provided below. An embodiment of the devices, systems, and methods may include any one or more, and any combination of, the examples described below.

In example 1, a communication device may comprise an audio encoding module to encode a piece of audio into an audio bit stream; an Avatar data extraction module to extract Avatar data from a piece of video and generate an Avatar data bit stream; and a synchronization module to generate synchronization information for synchronizing the audio bit stream with the Avatar data bit stream.

In example 2, the Avatar data according to the example 1, may include avatar parameters indicating at least one of movement and expression of an object presented in the video.

In example 3, the synchronization information according to any of examples 1 and 2, may be a time marker inserted in the audio bit stream and the avatar data bit stream.

In example 4, the synchronization information according to any of examples 1-3, may be generated based on a sampling rate of the audio bit stream and a sampling rate of the avatar data bit stream.

In example 5, the communication device according to any of examples 1-4, may further comprise: a packaging module to package the audio bit stream, Avatar data bit stream and the synchronization information into a packet; and a transmission module to transmit the packet to a server, regardless if another communication device going to receive the packet from the server is connected or not.

In example 6, the packet according to any of examples 1-5, may be an instant message.

In example 7, the packet according to any of examples 1-6, may include an identifier of an object presented in the video.

In example 8, a communication device may comprise an audio decoding module to decode an audio bit stream into decoded audio data; an Avatar animation module to animate an Avatar model based on an Avatar data bit stream to generate an animated Avatar model; and a synchronizing and rendering module to synchronize and render the decoded audio data and the animated Avatar model by utilizing the synchronization information.

In example 9, the synchronization information according to example 8, may be a time marker inserted in the audio bit stream and the avatar data bit stream.

In example 10, the communication device according to any of examples 8-9, may further comprise a receiving module to receive a packet from a server regardless if another communication device sending the packet is connected or not; and an unpacking module to unpack the packet into the audio bit stream, the avatar data bit stream and the synchronizing information.

In example 11, the Avatar animation module according to any of examples 8-10, may further retrieve the avatar model corresponding to an object presented in a piece of video captured by another communication device.

In example 12, the Avatar data according to any of examples 8-11, may include avatar parameters indicating at least one of movement and expression of an object presented in a piece of video captured by another communication device.

In example 13, the packet according to any of examples 8-12, may further comprise an identifier to identify an object presented in a piece of video captured by another communication device.

In example 14, the packet according to any of examples 8-13, may be an instant message.

In example 15, a method comprises encoding a piece of audio into an audio bit stream; extracting avatar data from a piece of video to generate an avatar data bit stream; and generating synchronization information for synchronizing the audio bit stream with the avatar parameter stream.

In example 16, the Avatar data according to example 15, includes Avatar parameters indicating at least one of movement and expression of an object presented in the video.

In example 17, the synchronization information according to any of examples 15-16, is a time marker inserted in the audio bit stream and the avatar data bit stream.

In example 18, the synchronization information according to any of examples 15-17, is generated based on a sampling rate of the audio bit stream and a sampling rate of the avatar data bit stream.

In example 19, the method according to any of examples 15-18, further comprises a packaging module to package the audio bit stream, avatar data bit stream and the synchronization information into a packet; and a transmission module to transmit the packet to a server, regardless if another communication device going to receive the packet from the server is connected or not.

In example 20, the packet according to any of examples 15-19, is an instant message.

In example 21, the packet according to any of examples 15-20, further includes an identifier of an object presented in the video.

In example 22, a method comprises decoding an audio bit stream into decoded audio data; animating an Avatar model based on an Avatar data bit stream to generate an animated Avatar model; and synchronizing and rendering the decoded audio data and the animated Avatar model by utilizing the synchronization information.

In example 23, the synchronization information according to example 22, is a time marker inserted in the audio bit stream and the avatar data bit stream.

In example 24, the method according to any of examples 22-23, comprises receiving a packet from a server regardless if another communication device sending the packet is connected or not; and unpacking the packet into the audio bit stream, the avatar data bit stream and the synchronizing information.

In example 25, the avatar animation module according to any of examples 22-24, further retrieves the avatar model corresponding to an object presented in a piece of video captured by another communication device.

In example 26, the avatar data according to any of examples 22-25, includes Avatar parameters indicating at least one of movement and expression of an object presented in a piece of video captured by another communication device.

In example 27, the packet according to any of examples 22-26, further comprises an identifier to identify an object presented in a piece of video captured by another communication device.

In example 28, the packet according to any of examples 22-27, is an instant message.

In example 29, a machine-readable medium, comprising a plurality of instructions that in response to being executed result in a communication device to perform the method of any of examples 15-21.

In example 30, a machine-readable medium, comprising a plurality of instructions that in response to being executed result in a communication device to perform the method of any of examples 22-28.

What is claimed is:

1. A communication device, comprising:
    a processor;
    a memory;
    one or more non-transitory computer-readable media comprising a plurality of instructions stored thereon that, when executed by the processor, causes the communication device to:
        encode a piece of audio into an audio bit stream;
        extract 3D avatar data from a piece of video of a user of the communication device and generate an avatar data bit stream, wherein to extract the 3D avatar data comprises to extract one or more parameters indicative of an out-of-plane rotation or a z-axis translation of the user; and
        generate synchronization information for synchronizing the audio bit stream with the avatar data bit stream,
        wherein the synchronization information comprises a first time marker inserted in the audio bit stream, a second time marker inserted in the avatar data bit stream, and correlating information correlating the first time marker and the second time marker.

2. The communication device of claim 1, wherein the 3D avatar data includes avatar parameters indicating at least one of movement and expression of an object presented in the video.

3. The communication device of claim 1, wherein the synchronization information is generated based on a sampling rate of the audio bit stream and a sampling rate of the avatar data bit stream.

4. The communication device of claim 1, wherein the plurality of instructions further causes the communication device to:
    pack the audio bit stream, the avatar data bit stream and the synchronization information into a packet; and
    transmit the packet to a server, without determining that another communication device that is going to receive the packet from the server is connected or not.

5. The communication device of claim 4, wherein the packet is an instant message.

6. The communication device of claim 4, wherein the packet is further to include an identifier of an object presented in the video, wherein the identifier is indicative of an Avatar model that is not a real model of the object.

7. A method, comprising:
    encoding a piece of audio into an audio bit stream;
    extracting 3D avatar data from a piece of video to generate an avatar data bit stream, wherein extracting the 3D avatar data from the piece of video comprises extracting one or more parameters from the piece of video indicative of an out-of-plane-rotation or a z-axis translation of the user;
    generating synchronization information for synchronizing the audio bit stream with the avatar data bit stream, wherein the synchronization information comprises a first time marker inserted in the audio bit stream, a second time marker inserted in the avatar data bit stream, and correlating information correlating the first time marker and the second time marker;
    packing the audio bit stream, the avatar data bit stream and the synchronization information into a packet; and
    transmitting the packet to a server.

8. The method of claim 7, wherein the avatar data includes avatar parameters indicating at least one of movement and expression of an object presented in the video.

9. The method of claim 7, wherein the synchronization information is generated based on a sampling rate of the audio bit stream and a sampling rate of the avatar data bit stream.

10. The method of claim 7, wherein the packet is further to include an identifier of an object presented in the video.

11. A communication device, comprising:
    a processor;
    a memory;
    one or more non-transitory computer-readable media comprising a plurality of instructions stored thereon that, when executed by the processor, causes the communication device to:

decode an audio bit stream into decoded audio data;

animate an Avatar model based on an Avatar data bit stream to generate an animated Avatar model, wherein the Avatar data bit stream comprises one or more parameters indicative of an out-of-plane rotation or a z-axis translation of the animated Avatar model and wherein the communication device includes the Avatar model prior to receipt of the Avatar data bit stream; and synchronize and render the decoded audio data and the animated Avatar model by utilizing synchronization information, wherein the synchronization information comprises a first time marker inserted in the audio bit stream, a second time marker inserted in the Avatar data bit stream, and correlating information correlating the first time marker and the second time marker.

12. The communication device of claim 11, wherein the plurality of instructions further causes the communication device to:

receive a packet from a server regardless if another communication device sending the packet is connected or not; and unpack the packet into the audio bit stream, the avatar data bit stream and the synchronizing information.

13. The communication device of claim 11, wherein the plurality of instructions further causes the communication device to retrieve the avatar model corresponding to an object presented in a piece of video captured by another communication device.

14. The communication device of claim 11, wherein the avatar data includes avatar parameters indicating at least one of movement and expression of an object presented in a piece of video captured by another communication device.

15. The communication device of claim 12, wherein the packet further comprises an identifier to identify an object presented in a piece of video captured by another communication device.

16. A method, comprising:

decoding an audio bit stream into decoded audio data;

acquiring an Avatar model;

animating the Avatar model based on an Avatar data bit stream to generate an animated Avatar model, wherein the Avatar data bit stream comprises one or more parameters indicative of an out-of-plane rotation or a z-axis translation of the animated Avatar model, wherein the Avatar model is acquired before receipt of the Avatar data bit stream, and wherein the Avatar data bit stream has been generated based on a piece of video of a user of another communication device; and synchronizing and rendering the decoded audio data and the animated Avatar model by utilizing synchronization information, wherein the synchronization information comprises a first time marker inserted in the audio bit stream, a second time marker inserted in the avatar data bit stream, and correlating information correlating the first time marker and the second time marker.

17. The method of claim 16, further comprising:

receiving a packet from a server regardless if the other communication device sending the packet is connected or not; and unpacking the packet into the audio bit stream, the avatar data bit stream and the synchronizing information.

18. The method of claim 17, wherein the packet further comprises an identifier to identify an object presented in a piece of video captured by the other communication device.

19. The method of claim 16, wherein the avatar data includes Avatar parameters indicating at least one of movement and expression of an object presented in a piece of video captured by the other communication device.

* * * * *